JOHN W. MASURY.

Improvement in Paint Mills.

No. 4,715. Reissued Jan. 16, 1872.

Witnesses:
Geo Haynes
R R Rabeau

John W. Masury

UNITED STATES PATENT OFFICE.

JOHN W. MASURY, OF NEW YORK, N. Y.

IMPROVEMENT IN PAINT-MILLS.

Specification forming part of Letters Patent No. 107,939, dated October 4, 1870; reissue No. 4,715, dated January 16, 1872.

Specification describing certain Improvements in Paint-Mills invented by JOHN W. MASURY, of the city, county, and State of New York, formerly of Brooklyn, in the county of Kings and State aforesaid.

It is a common defect in paint-mills of ordinary construction that the friction of the stones or grinding-surfaces generates a high degree of heat, which in many cases is injurious both to the stones and the paint, and makes the grinding operation very imperfect or laborious. This objection occurs both in grinding paint and other wet substances, but is especially felt in grinding certain paints, the menstruums of which are of a volatile nature, as owing to the evaporation of the liquid portion of said menstruums the paint becomes so thick and sticky that it is very difficult to grind it, and the mill fails to discharge its contents. It becomes, therefore, highly advantageous or desirable to provide means for lowering or controlling the temperature of at least one of the stones; and my invention consists in the application of a cooling fluid, such as cold water, to the backs of the grinding-surfaces, for the purpose of reducing the friction and heat consequent thereon, thereby allowing the mill to discharge its contents.

Figure 1:
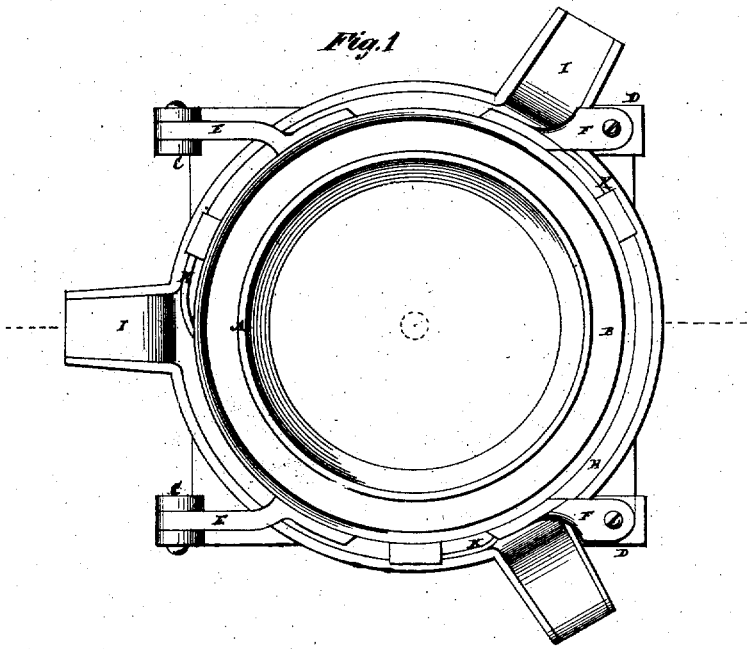
Figure 2:
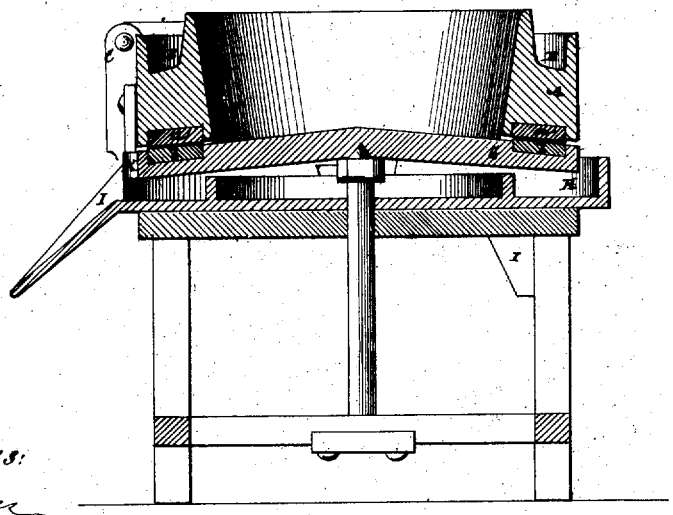

Figure 1 is a plan view of a paint-mill constructed according to my invention, and Fig. 2 a transverse sectional elevation of the same.

Similar letters of reference indicate corresponding parts in both figures of the drawing.

A is the upper fixed "stone" of a paint-mill, which stone may be composed of metal. This stone is constructed or provided with a cold-water passage, B, opposite to or at the back of its grinding-surface *a*, the other grinding-surface being designated by the letter *b*. Said passage may be an annular trough formed in top of the stone, or it may be a circular or other hollow space of a closed construction. In this passage I propose to maintain, in any suitable way and by any suitable pipe connections, or by means of siphons, a circulation of cooling fluid, such as cold water, for lowering the temperature of the stones or their grinding-surfaces and the paint or substance being ground between them. Said upper stone A is represented as suspended on the tops of posts C D of the frame by means of arms E F permanently attached to the periphery of said stone and resting on the posts, the arms E being hinged to the posts C so as to swing up and down thereon, and the arms F being detachably connected to the posts D, and preferably resting in recesses in their tops for the purpose of more effectually controlling the position of the stone. To raise the stone A from the bed-stone G the connections of the arms F are released and said stone swung over on the joints of the arms E, at the posts C, to any suitable support. H is the curb, at points around which a plurality or series of discharge-spouts, I, may be arranged for discharging the contents of the mill as ground into a series of vessels disposed beneath the spouts. This is an advantage over employing a single spout and one receiver, inasmuch as the series of vessels takes longer to fill, and, therefore, frequent removal of them becomes less necessary. A corresponding series of scrapers, K, may be used in connection with the spouts to detach any adhering paint or matter and insure its delivery into the spouts.

Having thus described my invention, I claim as new and desire to secure by Letters Patent—

A passage for the circulation of cold water or fluid arranged at the back of the grinding surface of the stone, substantially as and for the purpose or purposes herein set forth.

JOHN W. MASURY.

Witnesses:

WM. H. BROWN,

FRED. L. MILLER.